(12) United States Patent
Nordenfelt

(10) Patent No.: US 8,860,809 B2
(45) Date of Patent: Oct. 14, 2014

(54) DUAL TRANSMITTER TRACKER

(75) Inventor: Mikael Nordenfelt, Bergshammra (SE)

(73) Assignee: Trimble AB, Danderyd (SE)

( * ) Notice: Subject to any disclaimer, the term of this patent is extended or adjusted under 35 U.S.C. 154(b) by 109 days.

(21) Appl. No.: 13/575,435

(22) PCT Filed: Feb. 11, 2010

(86) PCT No.: PCT/EP2010/051730
§ 371 (c)(1),
(2), (4) Date: Aug. 23, 2012

(87) PCT Pub. No.: WO2011/098131
PCT Pub. Date: Aug. 18, 2011

(65) Prior Publication Data
US 2012/0327271 A1 Dec. 27, 2012

(51) Int. Cl.
*H04N 7/18* (2006.01)
*H04N 5/225* (2006.01)
*G01C 1/04* (2006.01)

(52) U.S. Cl.
CPC ...................................... *G01C 1/04* (2013.01)
USPC .......................................... 348/143; 348/169

(58) Field of Classification Search
USPC ................... 348/142, 143, 169–172
See application file for complete search history.

(56) References Cited

U.S. PATENT DOCUMENTS

| | | | |
|---|---|---|---|
| 6,734,952 B2 | 5/2004 | Benz et al. | |
| 7,924,441 B1 * | 4/2011 | Milanovi | 356/614 |
| 2003/0169414 A1 | 9/2003 | Benz et al. | |
| 2010/0245587 A1 * | 9/2010 | Otani et al. | 348/169 |
| 2011/0273564 A1 * | 11/2011 | Seger et al. | 348/148 |

FOREIGN PATENT DOCUMENTS

| | | |
|---|---|---|
| CN | 101458081 A | 6/2009 |
| EP | 0874218 A1 | 10/1998 |
| JP | 2000180168 A | 6/2000 |
| JP | 2001282872 A | 10/2001 |
| JP | 2009300441 A | 12/2009 |
| WO | WO-03062744 A1 | 7/2003 |
| WO | WO 2004/057269 | 7/2004 |
| WO | WO 2005/059473 | 6/2005 |

OTHER PUBLICATIONS

International Search Report PCT/ISA/210 for International Application No. PCT/EP2010/051730 dated Oct. 18, 2010.
Office Action for corresponding Chinese Application No. 2010800660976 dated Mar. 5, 2014 and English translation thereof.

* cited by examiner

*Primary Examiner* — Mekonnen Dagnew
(74) *Attorney, Agent, or Firm* — Harness, Dickey & Pierce

(57) ABSTRACT

A tracker unit for a measuring instrument and a method for operating a tracker unit are disclosed, to distinguish a specific target, such as at least one retroreflector, from other reflective objects in the vicinity of the measuring instrument. The tracker unit includes a plurality of photosensors and first and second optical radiation sources. Each photosensor adapted to generate at least one first set of signals during a period when the first optical radiation source is activated and the second optical radiation source is deactivated, and generate at least one second set of signals during a period when the second optical radiation source is activated and the first optical radiation source is deactivated. On basis of comparison between information extracted on basis of the first set of signals and the second set of signals, respectively, at least one specific target is distinguished from other reflective objects.

19 Claims, 9 Drawing Sheets

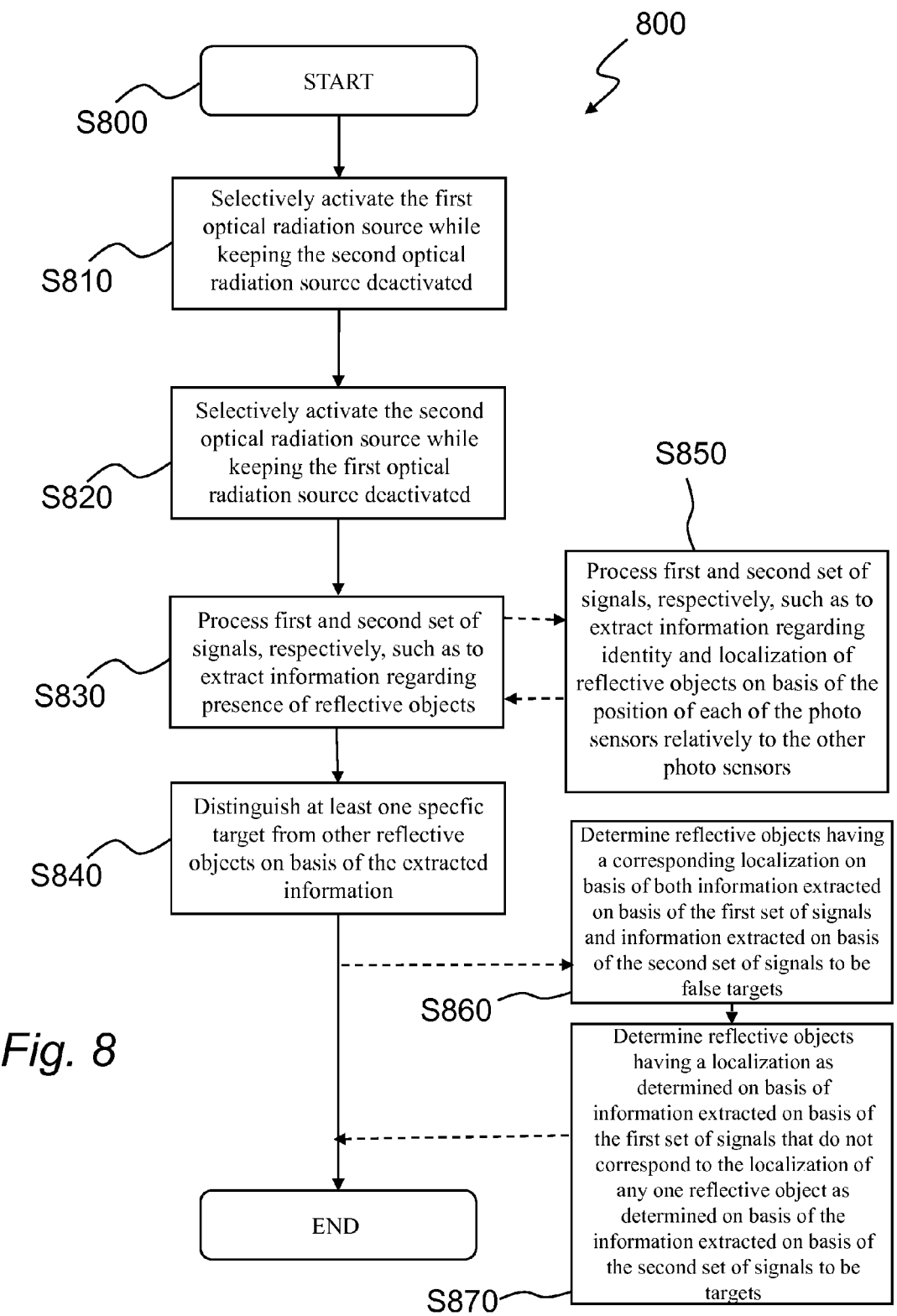

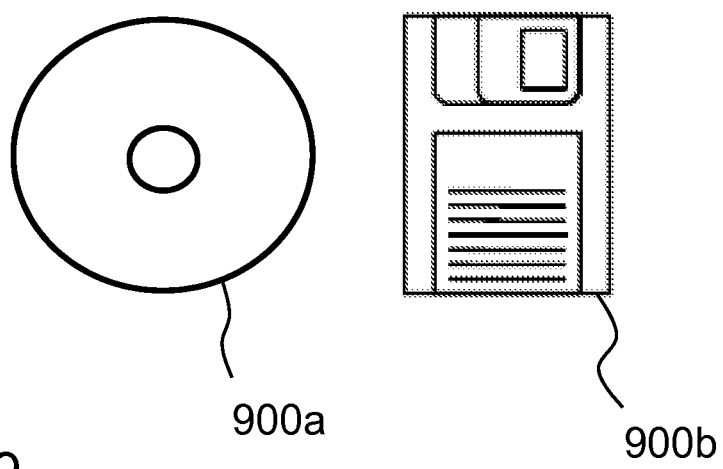
Fig. 9    900a    900b

DUAL TRANSMITTER TRACKER

TECHNICAL FIELD

The present invention relates to the art of measuring, such as surveying. In particular, the present invention relates to a method for distinguishing a target from other targets and a tracker for use in such an apparatus for distinguishing a target from other targets.

BACKGROUND

The art of surveying involves the determination of unknown positions, surfaces or volumes of objects or setting out of known coordinates using angle and distance measurements taken from one or more positions. In order to perform these measurements, a surveying device frequently is used comprising a distance measuring instrument with an integrated distance and angular measurement of the type referred to as a total station, i.e. comprising a combination of electronics and optics. A total station is furthermore provided with a computer or processing or control unit with writable information for measurements to be performed and for storing data obtained during the measurements. Preferably, the total station calculates the position of a target in a fixed ground-based coordinate system. A more detailed description of such a total station can for example be found in WO 2004/057269 by the same applicant.

In surveying, the use of a camera in a geodetic instrument such as a total station may provide for improved user convenience and new and improved functions. Particularly, a view such as an image or a video feed provided by the camera and shown on a display of the instrument may be used for assisting target selection and for providing the user with an overview of potential points of interest. For a general description of a geodetic instrument comprising a camera for capturing an image or a video feed of the view towards which the geodetic instrument is aimed, reference is made to WO 2005/059473.

Furthermore, the tracker system may also utilize a camera to track targets having reflective prisms, a so called camera-based tracker. Such a camera-based tracker includes a coaxial optical radiation source and receiving optics. In order to track or detect the target, two consecutive images are captured as close in time as possible. The first image is captured with the transmitter activated or switched on such that an area including the target is illuminated and the second is captured with the transmitter switched off. Accordingly, the first image captures objects within the area and the reflection from the reflective prism of the target (i.e. the reflected light from the prism) and the second image captures the objects within the area. Subsequently an image differentiating process is performed in which a differential image based on the two images is created and all non-reflective objects are cancelled out from the differential image. Thereby, an image including only the reflective target is obtained which can be used by the tracker when tracking the target.

However, if other reflective objects are present within the illuminated area such as traffic signs, reflective vests worn by persons working within the area, car lights, etc., the first image will in addition to the reflected light from the reflective prism also contain reflected light from the other reflective objects present within the illuminated area. Thus, the differential image will contain the reflective target as well as the other reflective objects. This will cause problem for the tracker since there is more than one object to track in the image, which in turn may lead to that the tracker loses track of the target (i.e. loses lock on the target) or that the aiming will become incorrect.

Hence, there is a need within the art for an improved tracker that is capable of tracking reflective prisms also in the presence of other reflective objects such as traffic signs, reflective vests worn by persons working within the area, car lights, etc.

There is also a need within the art for an improved tracker that is capable of tracking a movable object such as a reflective prism arranged on a vehicle such as an excavator in the presence of other reflective objects and which tracker is capable of distinguishing that specific object from other movable objects.

SUMMARY

It is with respect to the above considerations and others that the present invention has been made. The present invention seeks to mitigate, alleviate or eliminate one or more of the above-mentioned deficiencies and disadvantages singly or in combination. In particular, the inventor has realized that it would be desirable to achieve a tracker device that is capable of tracking a target including a retroreflector such as a prism in presence of other reflective objects such as traffic signs, reflective vests worn by persons working within the area, car lights, etc., with an improved accuracy and/or reliability.

The inventor has further realized that it would be desirable to achieve a tracker device that is capable of tracking a movable object such as a retroreflector, e.g. a reflective prism, for example arranged on a vehicle such as an excavator, in the presence of other reflective objects and which tracker device is capable of distinguishing that specific object from other movable objects.

To achieve the above-mentioned aspects and other singly or in combination, a tracker unit and and a method for operating a tracker unit having the features as defined in the independent claims are provided. Further advantageous embodiments of the present invention are defined in the dependent claims.

In the context of some embodiments of the present invention, by the wording "total station" used herein it is referred to a distance measuring instrument with integrated distance and angular measurement, i.e. with combined electronic, optical and computer components. Such an instrument can provide both the distance as well as the vertical and horizontal direction towards a target, whereby the distance is measured against an object or target such as a reflector. The wording "total station" as used in the context of some embodiments of the present invention comprises the following terms: surveying unit, measuring instrument, surveying instrument or geodetic instrument.

According to a first aspect of the present invention, there is provided a tracker unit for a measuring instrument including an instrument body, which tracker unit is adapted to distinguish at least one specific target comprising at least one retroreflector from other targets and/or other reflective objects in the vicinity of the measuring instrument. The tracker unit comprises a plurality of photosensors. Each photosensor is adapted to generate a signal corresponding to intensity of reflected optical radiation impinging on the photosensor. The tracker unit comprises a first and at least one second optical radiation source. Each of the first and second optical radiation sources is arranged in the instrument body and configured to emit optical radiation when activated. The first optical radiation source is coaxially arranged in relation to at least some photosensors in the plurality of photosensors and the at least one second optical radiation source is eccentrically arranged in relation to first optical radiation source. The tracker unit comprises a control module adapted to at least once selectively activate and deactivate the first and/or the at least one second optical radiation source. The control module is adapted to cause the plurality of photosensors to generate at least one first set of signals during a period when the first optical radiation source is activated and the at least one second optical radiation source is deactivated, and generate at least one second set of signals during a period when the at least one second optical radiation source is activated and the first optical radiation source is deactivated. The tracker unit comprises a signal processing unit adapted to extract information on basis of the at least one first set of signals and the at least one second set of signals, respectively, regarding presence of reflective objects in the vicinity of the measuring instrument. The signal processing unit is adapted to, on basis of a comparison between the information extracted on basis of the first set of signals and the second set of signals, respectively, distinguish at least one specific target from other targets and/or other reflective objects in the vicinity of the measuring instrument.

According to a second aspect of the present invention, there is provided a method for operating a tracker unit for a measuring instrument including an instrument body. The tracker unit comprises a plurality of photosensors, wherein each photosensor is adapted to generate a signal corresponding to intensity of reflected optical radiation impinging on the photosensor. The tracker unit comprises a first and at least one second optical radiation source, each of the first and second optical radiation sources being arranged in the instrument body and configured to emit optical radiation when activated. The first optical radiation source is coaxially arranged in relation to at least some photosensors of the plurality of photosensors and the at least one second optical radiation source is eccentrically arranged in relation to the first optical radiation source. The first optical radiation source is selectively activated at least once while the at least one second optical radiation source is deactivated. Thereby, the plurality of photosensors is caused to generate at least one first set of signals. The at least one second optical radiation source is selectively activated at least once while the first optical radiation source is deactivated. Thereby, the plurality of photosensors is caused to generate at least one second set of signals. The at least one first set of signals and the at least one second set of signals are processed, respectively, such as to extract information on basis of the at least one first set of signals and the at least one second set of signals, respectively, regarding presence of reflective objects in the vicinity of the measuring instrument. On basis of a comparison between the information extracted on basis of the first set of signals and the second set of signals, respectively, at least one specific target is distinguished from other targets and/or other reflective objects in the vicinity of the measuring instrument.

With regards to the above-mentioned processing of the at least one first set of signals and the at least one second set of signals, respectively, such as to extract information on basis of the at least one first set of signals and the at least one second set of signals, respectively, regarding presence of reflective objects in the vicinity of the measuring instrument, that information can for example be extracted on basis of the magnitude of the at least one first set of signals and the at least one second set of signals (corresponding to intensity of optical radiation impinging on the respective photodetector as described in the foregoing), respectively, as a function of the position of each of the respective photosensors relatively to the other photosensors.

Thus, the present invention is based on that the focused reflection (the small reflection angle) of a retroreflector, e.g. a reflective prism, used in the targets can be utilized to increase the accuracy and/or reliability of the tracking process. In other words, the present invention is based on that the retroreflector, such as a prism, is an almost 'perfect' reflector, which can be utilized to increase the accuracy and/or reliability of a tracking process. More specifically, the fact that in principle all optical radiation impinging on the retroreflector (e.g., a prism) will be reflected in the same direction as it enters the retroreflector (with exception for small diffraction effects) is utilized while the optical radiation impinging on other reflective objects present within the illuminated area diffuses or spreads the reflected light significantly, i.e. the other reflective objects have a relatively wide reflection angle when compared to the reflection angle of the retroreflector.

Alternatively or optionally, embodiments of the present invention can be utilized to determine the extent to which the target can be considered to comprise an 'ideal' retroreflector. In this context, by an "ideal" retroreflector it is meant a retroreflector for which substantially all optical radiation impinging on the retroreflector is reflected in the same direction as it enters the retroreflector. In case no presence of the target in the vicinity of the measuring instrument can be ascertained whatsoever on basis of the information extracted on basis of the at least one second set of signals, but only on basis of the information extracted on basis of the at least one first set of signals, the target can be considered to comprise an ideal retroreflector.

By extraction of information regarding identity and localization of reflective objects in the vicinity of the measuring instrument as described in the following, embodiments of the present invention can be used to determine the direction to the target relatively to the measuring instrument. For example, the azimuth of the target relatively to the measuring instrument may be determined (e.g., the angle between the line-of-sight vector from the measuring instrument to the target, projected onto a reference plane [such as the horizontal plane], and a reference vector on the reference plane [such as true north]). The position of the measuring instrument can be determined for example by means of a Global Positioning System (GPS) device or a total station.

The tracker unit can be camera based or non-camera based, as further discussed in the following.

According to a first example, the tracker unit is camera based. By capturing two images using non-coaxially arranged optical radiation sources, where one of the optical radiation sources is arranged co-axially in relation to the camera device (this optical radiation source may in the following be referred to as "non-coaxial optical radiation source") and the optical radiation sources are alternately activated, one image can be obtained including the reflections from the retroreflector as well as other reflective objects within the illuminated area (when the optical radiation source being arranged co-axially with the camera device is activated and the other is deactivated) and one image can be obtained including substantially only the reflections from the other reflective objects (when the optical radiation source being arranged co-axially with the camera device is activated while the other is deactivated) is obtained. The non-coaxial optical radiation source may be arranged at at least a distance from the axis of the camera device corresponding to about the diameter of the prism. On one hand, in this case optical radiation (e.g., visible light) emitted from this optical radiation source impinging on the retroreflector is reflected at such an angle that the camera device will be unable to capture the reflection from the retroreflector. On the other hand, the optical radiation emitted from the optical radiation source arranged co-axially in relation to the camera device impinging on the retroreflector will be reflected at an angle such that the camera device captures this reflected optical radiation. Due to the wide reflection angles of the other reflective objects, the reflected optical radiation when illuminated by both optical radiation sources is captured by the camera device. That is, the reflections from the other reflective objects within the illuminated area will look substantially or even almost exactly the same for the camera device regardless of which optical radiation source of the first and second optical radiation sources that is activated. By performing a image differentiating process such that the two images are subtracted from each other, a resulting or differential image is obtained including only the reflected optical radiation from the retroreflector. Hence, the accuracy and/or reliability of the tracking process may be improved significantly.

According to a second example, the tracker unit is non-camera based. However, the non-camera based tracker unit generally operates according to the principles described above with reference to the camera based tracker unit and has the same or similar advantages compared to the camera based tracker unit described in the foregoing. This is further described in the following. The non-camera based tracker unit does not utilize difference images in the same sense such as described in the foregoing with regards to the camera based tracker unit. Instead, each of the non-coaxial optical radiation source and the coaxially arranged optical radiation source is configured to emit optical radiation having a predetermined frequency and such that the phases of the optical radiation emitted by the first and the second optical radiation sources, respectively, differ by a predetermined phase shift. By blocking reflected optical radiation impinging on the plurality of photosensors that have frequencies outside a predetermined frequency interval including the predetermined frequency, on one hand retroreflector targets will give rise to a signal detected at the plurality of photodetectors when the coaxially arranged optical radiation source is activated (and the non-coaxial radiation source is deactivated) but not when the non-coaxial optical radiation source is activated (and the coaxially arranged optical radiation source is deactivated). On the other hand, reflective objects other than the retroreflectors will give rise to a signal detected at the plurality of photodetectors regardless of which optical radiation source that is activated. Thus, by comparing signals generated by the plurality of photosensors when the coaxially arranged optical radiation source is activated (and the non-coaxial radiation source is deactivated) and signals generated by the plurality of photosensors when the non-coaxial optical radiation source is activated (and the coaxially arranged optical radiation source is deactivated) a target may be distinguished from other targets and/or other reflective objects in the surroundings.

Each of the first and second examples described immediately above applies to the case where there is a single non-coaxial optical radiation source. However, as described in the foregoing there can be one or more non-coaxial optical radiation sources.

The predetermined phase shift may for example have a magnitude of about 180°.

A non-camera based tracker unit as discussed herein can for example be implemented in a so called quadrant detector based tracker system.

On basis of the at least one first set of signals and the at least one second set of signals, respectively, and the position of each of the respective photosensors relatively to the other photosensors, information regarding identity and localization of reflective objects (e.g. localized on an image and/or on a photosensor surface) in the vicinity of the measuring instrument may be extracted. On one hand, reflective objects having a corresponding localization as determined on basis of both the information extracted on basis of the at least one first set of signals and the information extracted on basis of the at least one second set of signals are determined to be false targets. On the other hand, reflective objects having a localization as determined on basis of the information extracted on basis of the at least one first set of signals that do not correspond to (e.g. matches) the localization of any one reflective object as determined on basis of the information extracted on basis of the at least one second set of signals, are determined to be, or identified as, (true) targets.

For example, information regarding localization and identity of reflective objects in the vicinity of the measuring instrument may be extracted by mapping a set of signals (each signal corresponding to intensity of reflected optical radiation impinging on the respective photodetector) generated by the plurality of photosensors with the positions of the respective photosensors relatively the other photosensors.

In other words, information regarding localization and/or identity of reflective objects can be determined by determining the localization of reflective objects on a surface of the plurality of photosensors, for example in an image.

However, on a condition that a difference between intensities corresponding to the at least one first set of signals and intensities corresponding to the at least one second set of signals is below a predetermined intensity threshold, the true targets mentioned immediately in the foregoing may nevertheless be determined, or identified, as false targets. Such a configuration enables coping with a case where the reflected optical radiation from 'false' targets varies between periods when the first optical radiation source is activated and when the at least one second optical radiation source is activated, respectively, such that the false targets are identified as true targets when determining correspondence between (e.g., matching) the localization of reflective objects as determined on basis of the information extracted on basis of the at least one first set of signals and the localization of any one reflective object as determined on basis of the information extracted on basis of the at least one second set of signals, as described in the foregoing.

In the context of some embodiments of the present invention, by "false targets" it is referred to objects that do not correspond to targets that is desired to track and/or identify, such as road signs, reflective clothing worn by persons in the surroundings, car lights, etc.

The plurality of photodetectors may be caused to generate at least one third set and at least one fourth set of signals during respective periods when all of the first and the second optical radiation sources are deactivated. The at least one first set of signals and the at least one third set of signals are generated consecutively and the at least one second set of signals and the at least one fourth set of signals are generated consecutively. On basis of the at least one first set of signals, the at least one second set of signals, the at least one third set of signals and the at least one fourth set of signals respectively, and the position of each of the respective photosensors relatively to the other photosensors, information regarding identity and localization of reflective objects in the vicinity of the measuring instrument may be extracted. Then, on one hand reflective objects having a corresponding localization as determined on basis of both the information extracted on basis of the at least one first set of signals and the at least one third set of signals, and the information extracted on basis of the at least one second set of signals and the at least one fourth set of signals, respectively, are determined to be false targets. On the other hand, reflective objects having a localization as determined on basis of the information extracted on basis of the at least one first set of signals and the at least one third set of signals that do not correspond to the localization of any one reflective object as determined on basis of the information extracted on basis of the at least one second set of signals and the at least one fourth set of signals, are determined to be, or identified as, (true) targets.

In other words, a succession of a first set of signals and a third set of signals may be generated, wherein on basis of each of the first set of signals and the respective third set of signals generated consecutive to the first set of signals the localization and identity of reflective objects in the vicinity of the measuring instrument may be extracted. In view of the foregoing, the objects thus identified are basically going to comprise all or nearly all reflective targets, that is both 'true' targets (comprising retroreflectors) and 'false' targets (i.e. roadsigns, reflective clothing, etc.). Then, with a predetermined frequency, a second set of signals is generated and a respective fourth set of signals generated consecutively to the second set of signals. In view of the foregoing, as the at least one eccentrically arranged second optical radiation source is activated when the second set of signals is generated, the objects thus identified are going to comprise substantially only the 'false' targets and not any of the 'true' targets. Such a configuration may enable taking into account moving targets (moving in relation to the tracker unit) as it enables during a specified period to keep track of which objects that are true targets and which objects that are false targets.

For facilitating keeping track during a predetermined period of time of which targets that are true targets and which targets that are false targets set(s) of signals generated by the plurality of photosensors can be stored in a memory unit, whereby set(s) of signals generated by the plurality of photosensors can be compared with previously stored set(s) of signals generated by the plurality of photosensors.

As already indicated in the foregoing, the first and the at least one second optical radiation source may be arranged such that a distance between the first and the at least one second optical radiation source amounts to at least the extent in a predetermined dimension of a retroreflector of at least one target. For example, the first and the at least one second optical radiation source may be arranged such that a distance between the first and the at least one second optical radiation source amounts to at least a diameter of a light receiving portion of a retroreflector (e.g., a prism) of the least one target.

The extracted information may comprise signal strength.

The extracted information regarding objects being present in the at least one differential image may comprise one or more of shapefactor, area and/or signal strength.

In the context of some embodiments of the present invention, by "shapefactor" it is referred to dimensionless quantities for numerically describing the shape of an entity independent of the size of the entity, such as aspect ratio, circularity, etc.

The tracker unit may comprise a plurality of second optical radiation sources. The control module may be adapted to selectively activate and/or deactivate each of the plurality of second optical radiation sources concurrently. In other words, every one of the plurality of second optical radiation sources may be in an active or inactive state simultaneously.

Such a configuration may enable achieving an increase in the accuracy of the tracker unit, as it enables increasing the accuracy in detecting presence of reflective objects in the vicinity of the measuring instrument on basis of information based on the at least one second set of signals, for example by comparing information extracted on basis of several second sets of signals.

The plurality of optical radiation sources may for example be circularly arranged in a spaced succession relatively to the first optical radiation source. In other words, all of the plurality of second optical radiation sources may be arranged in spaced succession on the circumference of a circle centered on the first optical radiation source.

According to one example the spacing along the circumference between all pairs of second optical radiation sources of the plurality of second optical radiation sources may be the same.

Another shape than circular may be possible.

In addition, the present invention can be implemented in a computer program product comprising computer code that, when executed on a processing unit such as a central processing unit (CPU), is adapted to perform the method according to the present invention in a measuring instrument, such as a surveying instrument. The computer program product may for example be downloaded into a surveying instrument or other measuring instrument as an upgrade. The method according to the present invention can be implemented for a surveying instrument using software, hardware, firmware or a combination thereof as desired in view of the particular circumstances such as application, design or user requirements and/or needs. The computer program product can be stored on a computer-readable storage medium, such as for example a Digital Versatile Disc (DVD), a Compact Disc (CD), a floppy disk, a Universal Serial Bus (USB) memory device, etc., or any other suitable computer-readable storage medium.

The steps of any method disclosed herein do not have to be performed in the exact order disclosed, unless explicitly stated.

Further objects and advantages of the various embodiments of the present invention will be described below by means of exemplifying embodiments of the present invention.

BRIEF DESCRIPTION OF THE DRAWINGS

Exemplifying embodiments of the present invention will be described below with reference to the accompanying drawings, in which:

FIG. 8 is a flowchart of a method for operating a tracker unit according to an exemplifying embodiment of the present invention; and FIG. 9 is a schematic view of computer readable digital storage mediums according to exemplifying embodiments of the present invention.

In the accompanying drawings, like reference numerals refer to the same or similar elements throughout the views.

DETAILED DESCRIPTION

The present invention will now be described more fully hereinafter with reference to the accompanying drawings, in which exemplifying embodiments of the invention are shown. This present invention may however be embodied in many different forms and should not be construed as limited to the embodiments set forth herein, these embodiments are rather provided by way of example so that this disclosure will convey the scope of the invention to those skilled in the art.

Figure 1:
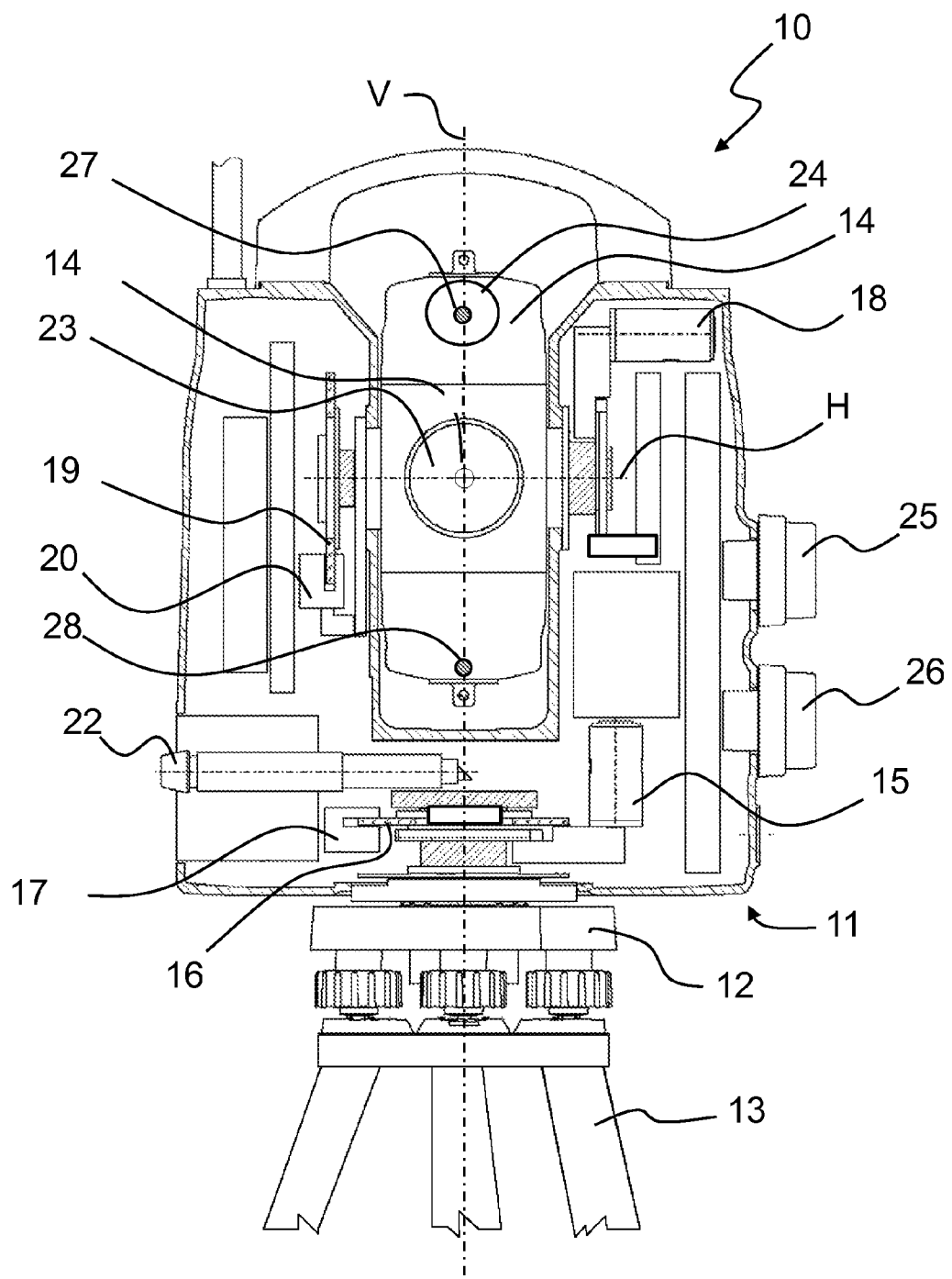
FIG. 1 is a schematic illustration of a total station according to an exemplifying embodiment of the present invention.

Referring now to FIG. 1, there is shown a schematic illustration of a total station 10 according to an exemplifying embodiment of the present invention. In many aspects, the total station 10 comprises features known from previous instruments. For example, the total station 10 shown in FIG. 1 comprises an alidade 11 mounted on a base 12, and has a mounting support structure in the form of a tripod 13. The alidade 11 can be rotated about a vertically oriented rotation axis V, in order to aim the instrument in any desired horizontal direction. In the alidade, there is arranged a center unit 14 or telescope unit, which can be rotated about a horizontally oriented rotation axis H, in order to aim the instrument in any desired vertical direction. Measurements made using the total station 10 are typically related to an origin of coordinates located at the intersection between the vertically oriented and the horizontally oriented rotation axes V and H.

For rotation of the alidade about the vertically oriented rotation axis to aim the instrument in any desired horizontal direction, there is provided drive means 15. The rotational position of the alidade 11 is tracked by means of a graduated disc 16 and a corresponding angle encoder or sensor 17. For rotation of the center unit 14 about the horizontally oriented rotation axis, there are provided similar drive means 18, graduated disc 19 and sensor 20. Moreover, the instrument has an optical plummet 22, which gives a downwards view along the vertically oriented rotation axis. The optical plummet is used by the operator to center or position the instrument above any desired point on the ground.

As mentioned above, the instrument line of sight is centered at the intersection between the vertical and the horizontal rotation axes, and this can be seen in FIG. 1 where these axes cross in the center of a telescope 23 in the center unit 14.

In the center unit, a camera device 24 is further arranged for capturing an image or a video feed generally in the direction of the instrument line of sight. A first optical radiation source 27, for example comprising a laser, is arranged coaxial in relation to the camera device 24.

A second optical radiation source 28 is eccentrically arranged in relation to camera device 24 and the first optical radiation source 27, which second optical radiation source 28 for example may comprise a laser. However, as shown in FIG. 1 the second optical radiation source 28 is eccentric in relation to the center of the camera device 24; but could be located in many other positions than the position shown in FIG. 1. According to one example the distance between the first optical radiation source 27 and the second optical radiation source 28 is approximately equal to a retroreflector diameter of a target (not shown in FIG. 1).

It is to be understood that the positional arrangement of the optical radiation sources 27, 28 on the total station 10 is exemplifying and variations are possible.

The first and/or the second optical radiation source 27, 28 can for example also be used for performing electronic distance measuring (EDM).

Figure 2:
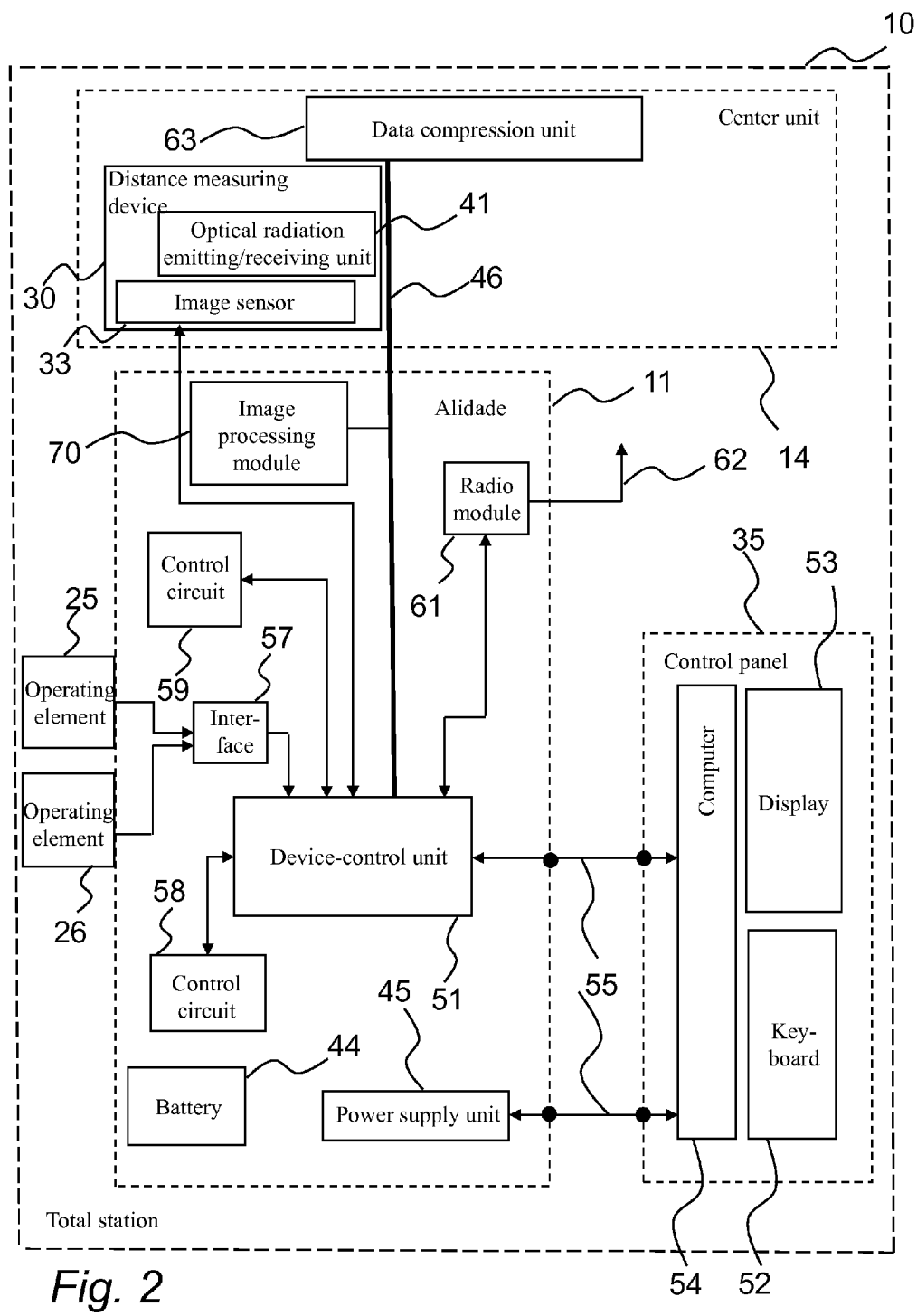
FIG. 2 is a schematic block diagram of the total station illustrated in FIG. 1.

The camera device 24 includes an objective (not shown in FIG. 1), a focusing lens (not shown in FIG. 1) and an image sensor 33, see FIG. 2. An object is imaged by the objective and focusing lens onto the image sensor. The image sensor is a CCD matrix sensor which comprises an arrangement of photo detecting elements which to a very good approximation is rectangular.

Referring now to FIG. 2 there is shown a schematic block diagram of the total station 10 illustrated in FIG. 1.

The total station 10 includes a distance measuring device 30 comprising an optical radiation emitting/receiving unit 41, which may include the first and second optical radiation source 27, 28, and the camera device 24, or may be connected to the first and second optical radiation source 27, 28, and the camera device 24. Alternatively, the emitting/receiving unit 41 may include the camera device 24 and the first optical radiation source 27. The emitting/receiving unit 41 may further include an objective and a beam splitting prism (not shown in FIG. 2). The emitting/receiving unit 41 may be adapted to emit pulses of infrared radiation and measure the time of flight of the pulses from the emitting/receiving unit 41 to a target and back to the emitting/receiving unit 41 and on basis of the times of flight determine the distance between the target and the total station 10. Further, the emitting/receiving unit 41 may also be adapted to selectively activate the first and second optical radiation source 27, 28, upon instruction from a device-control unit 51 arranged in the alidade 11 for controlling operation of the total station 10.

A battery 44 is arranged in the alidade 11 feeds a power supply unit 45 which server to supply the total station with power. The power supply unit 45 supplies all components and devices in the alidade 11 and the center unit 14, as well as any modules connected to it, with the required operating voltages. For the sake of better overview these connecting lines are not shown in FIG. 2. The individual components can be connected individually via separate lines as the case for components within the alidade 11 or by a central bus 46 which provides data and power supply lines between the alidade 11 and the center unit 14.

For control or operation of the total station 10, the total station is provided with a control panel 35 and operating elements 25, 26, in the form of angle encoders arranged on the alidade 11 being operable by corresponding knobs. The device-control unit 51 is arranged in the alidade 11 for controlling operation of the total station and is supplied with power by the power supply unit 45.

The control panel 35 serves for communication between the operator and the total station 10 and is provided with a keyboard 52 for input, a display 53 for output of data and images captured by the camera device 24, e.g. a Liquid Crystal Display (LCD), and a computer 54 which is connected to the display 53 and the keyboard 52.

The control panel 35 is connected to the device-control unit 51 arranged in the alidade 11 and the power supply unit 45 via a releasable connection 55. Since the control panel is removable, it may be equipped with its own battery, which ensures that the computer 54 continues to work even when the control panel 35 is removed from the alidade 11. The computer 54 is connected to the device-control unit 51 via a connection 55 and is capable of performing numerous geodesic calculations by means of its program and memories.

The operating elements 25, 26 are connected to the device-control unit 51 via corresponding interface 57. This interface 57 allows generation of signals corresponding to a rotary position of the operating elements 25, 26, respectively, which are transmitted to the device-control unit 51.

The operating elements 25 and 26 serve for controlling rotation of the alidade 11 about the vertical axis V and tilting of the center unit 14 about the tilting axis H, respectively. In response to signals from the operating elements 25 and 26, respectively, and the interface 57 the device-control unit 51 controls via control circuits 58 and 59 in the alidade 11 the drive means 15 and 18 to rotate the alidade 11 about the vertical axis V and the tilting axis V, respectively. Angle measurements may be used to control the drive means 15 and 18.

The drive means 15 and 18 is not necessarily controlled solely by the operating elements 25 and 26. respectively, but may also be controlled on the basis of a program comprising machine instructions stored and executed in the device-control unit 51 or on the basis of commands sent to the device-control unit 51.

The drive means 15 and 18 cooperate with the angle-measuring device, i.e. the graduated disc 16 for the horizontal angle and the corresponding angle encoder or sensor 17, or the graduated disc 19 for the vertical angle and the corresponding sensor 20, respectively, such that the alidade 11 with the center unit 14 can be rotated as desired about the vertical axis V and the center unit 14 can be rotated about the horizontal axis H in a measurable manner and can be brought in to a desired horizontal and vertical angle position. This purpose is served inter alia by the device-control unit 51 which receives signals from the sensors 17 and 20 and controls the control circuit 58 for the horizontal drive means 15 and the control circuit 59 for the vertical drive means 18 in response to said signals.

Furthermore, the total station 10 may include a radio module 61, which is connected to the device-control unit 51 and has an antenna 62, serves to exchange data with remote device, such as a remote control. For example, the total station 10 may be remotely controlled by means of a remote control or station.

For processing the signals from the image sensor of the camera device 24, a data compression unit 63 is provided in the center unit 14 which is adapted to compress image data received from the image sensor. The compressed data can then be sent to the device-control unit 51 which may process and/or forward the data to the computer 54 and the display 53.

The device-control unit 51 comprises a volatile memory, a non-volatile memory and a processor for executing programs stored in the non-volatile memory. An image processing module 70 is adapted to process the images obtained from the image sensor and display the processed image on the display 53 using the computer 54 of the control panel, which image processing module 70 may be integrated in the device-control unit 51 or may be a separate module connected to the device-control unit 51. Furthermore, the image processing module 70 may be a program module implemented in the device-control unit 51 adapted to execute, for example, image differentiating procedures. The image processing module 70 may also be arranged in the center unit 14, or in any other suitable location depending on application and/or use.

The image processing module 70 is further adapted to perform image differentiating to create differential images. According to one embodiment, the image processing module 70 is adapted to process at least a first image captured by the camera device 24 when the first transmitter 27 is activated to emit light and at least a second image captured by the camera device 24 when the second transmitter 28 is activated to emit light to create a differential image in which reflections from objects captured in both of the at least two images are removed. This will now be described in more detail with reference to FIGS. 3a, 3b, 4a, 4b, 5 and 6.

Figure 3A:
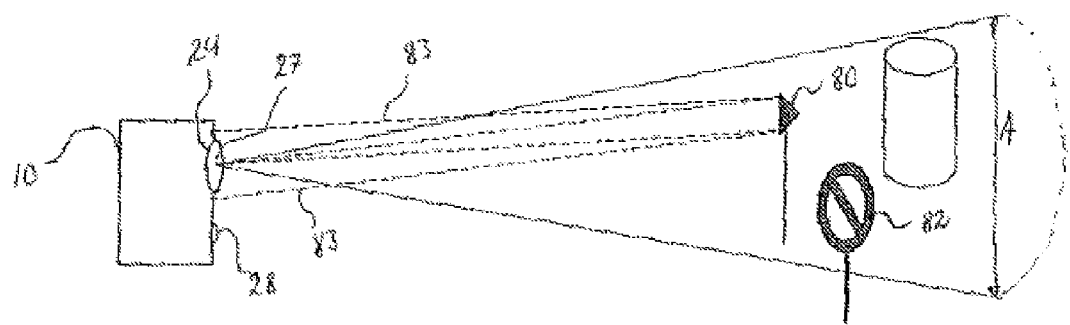
FIG. 3a is a schematic view for illustrating principles of an exemplifying embodiment of the present invention.

In FIG. 3a, the first optical radiation source 27, which is substantially coaxial in relation to the camera device 24, is activated and illuminates an area A including a target 80 and a reflective traffic sign 82. The camera device 24 captures the reflection light from the target 80 as well as the reflection light from the traffic sign 82. Since the target 80 contains a retroreflector, in this case a prism, in principle all light will be returned in substantially the same direction as it entered the retroreflector (except for diffraction effects). The reflection from the target 80 is indicated with the dashed lines 83.

Figure 3B:
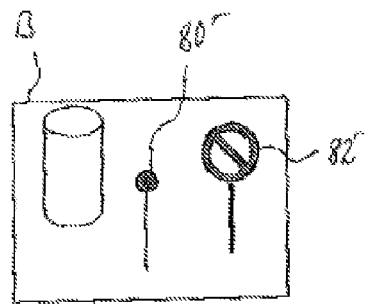
FIG. 3b is a schematic view for illustrating principles of an exemplifying embodiment of the present invention.

The captured image B is shown in FIG. 3b and, as can be seen, the image B contains one reflection 80' from the target 80 and one reflection 82' from the traffic sign 82. In this image B both the target 80 and the traffic sign 82 is captured since the optical radiation source 27 is coaxially arranged in relation to the camera device 24 and the reflected light from the target 80 having the narrow reflection angle will hence impinge on the image sensor of the camera device 24.

Figure 4A:
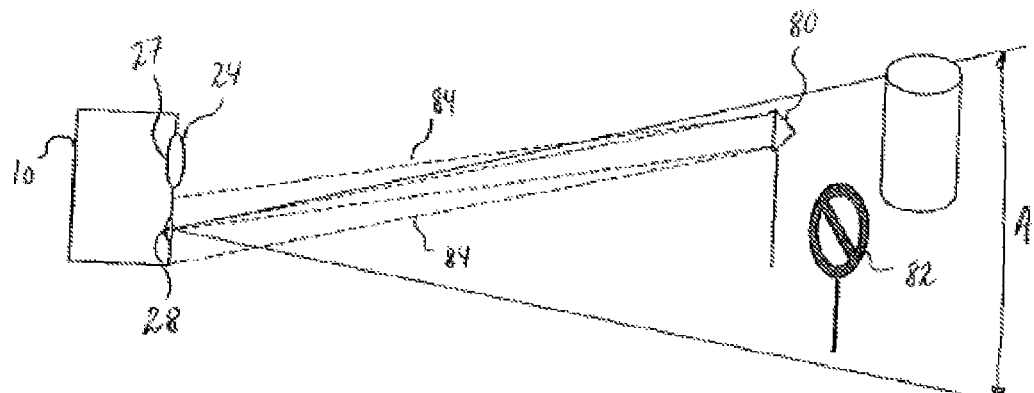
FIG. 4a is a schematic view for illustrating principles of an exemplifying embodiment of the present invention.

In FIG. 4a, the second optical radiation source 28, which is non-coaxial and eccentrically arranged in relation to the camera device 24, is activated and illuminates substantially the same area A as the first optical radiation source 27. In this case, the camera device 24 will basically only capture the reflection light from the traffic sign 82 due to the fact that the second optical radiation source 28 is arranged more or less a prism diameter from the camera device 24. Thereby, the narrow reflection angle of the prism and the fact the light is reflected basically in same direction as it entered the prism will entail that the reflected light from the target will be centered about the second optical radiation source 28, the reflection from the target 80 is indicated with the dashed lines 84. The traffic sign 82 has a wide reflection angle and thus the camera device 24 will capture light reflected from the traffic sign 82 also when the second optical radiation source 28 is activated and illuminates area A.

Figure 4B:
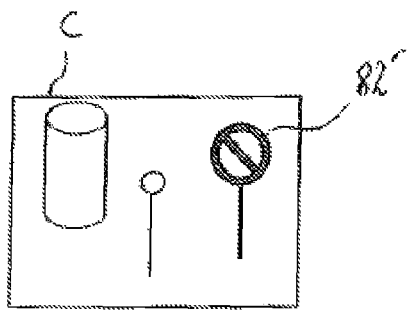
FIG. 4b is a schematic view for illustrating principles of an exemplifying embodiment of the present invention.

In FIG. 4b, the captured image C is shown and, as can be seen, only the reflection 82' from traffic sign is captured. In other words, all reflective objects except from the target will in principle look almost the same in respect of the camera device 24 regardless of which optical radiation source 27, 28 that is activated (i.e., lit).

Figure 5:
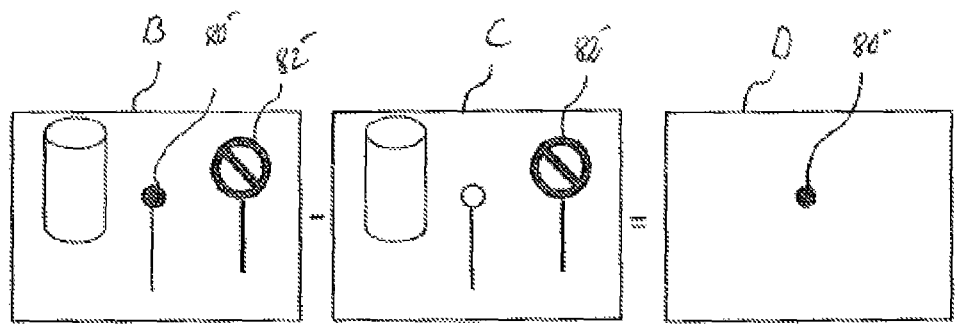
FIG. 5 is a schematic view for illustrating principles of an exemplifying embodiment of the present invention.

In FIG. 5 the principle for the image differentiating is illustrated. The image C, where the second optical radiation source 28 is activated, is subtracted from the image B, where the first optical radiation source 27 is activated. In the resulting differential image D, all objects common for the two images B, C has been removed and hence in principle only the reflection 80' from the target will remain in image D.

Figure 6:
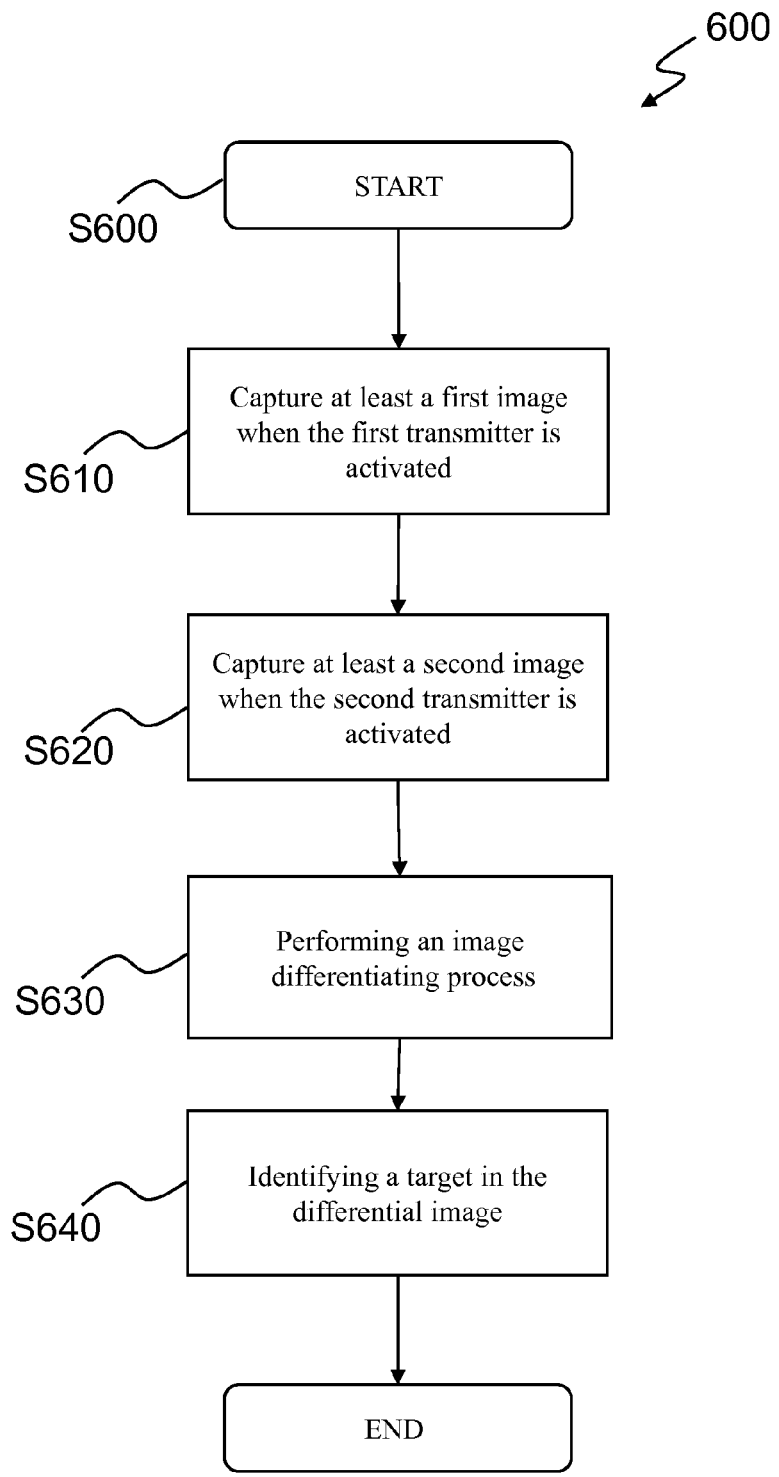
FIG. 6 is a flowchart of a method according to an exemplifying embodiment of the present invention.

Referring now to FIG. 6, principles of a method 600 according to an exemplifying embodiment of the present invention will be described. First, in step S600, a process of identifying and tracking a target is initiated. For example, this can be performed by an operator via the control panel 35 or via an instruction transferred wirelessly to the total station 10 via the radio module 61 and the antenna 62. Thereafter, at step S610 the camera device 24 is instructed to capture at least a first image of a scene A when the first optical radiation source 27 is activated to emit optical radiation (and the second optical radiation source 28 is inactive). The first image B is shown in FIG. 3b.

Then, at step S620 the camera device 24 is instructed to capture at least a second image of the scene A when the second optical radiation source 28 is activated to emit optical radiation (and the first optical radiation source 27 is inactive). The captured second image C is shown in FIG. 4b. The first and second images B, C may be captured at points in time having a relatively small temporal separation or having a temporal separation that is as small as possible, i.e. at consecutive points in time.

Thereafter, at step S630 an image differentiating process is performed to create a differential image D between the first image B and the second image C, see FIG. 5.

In step S640, the target 80' is identified in the resulting differential image D.

Figure 7A:
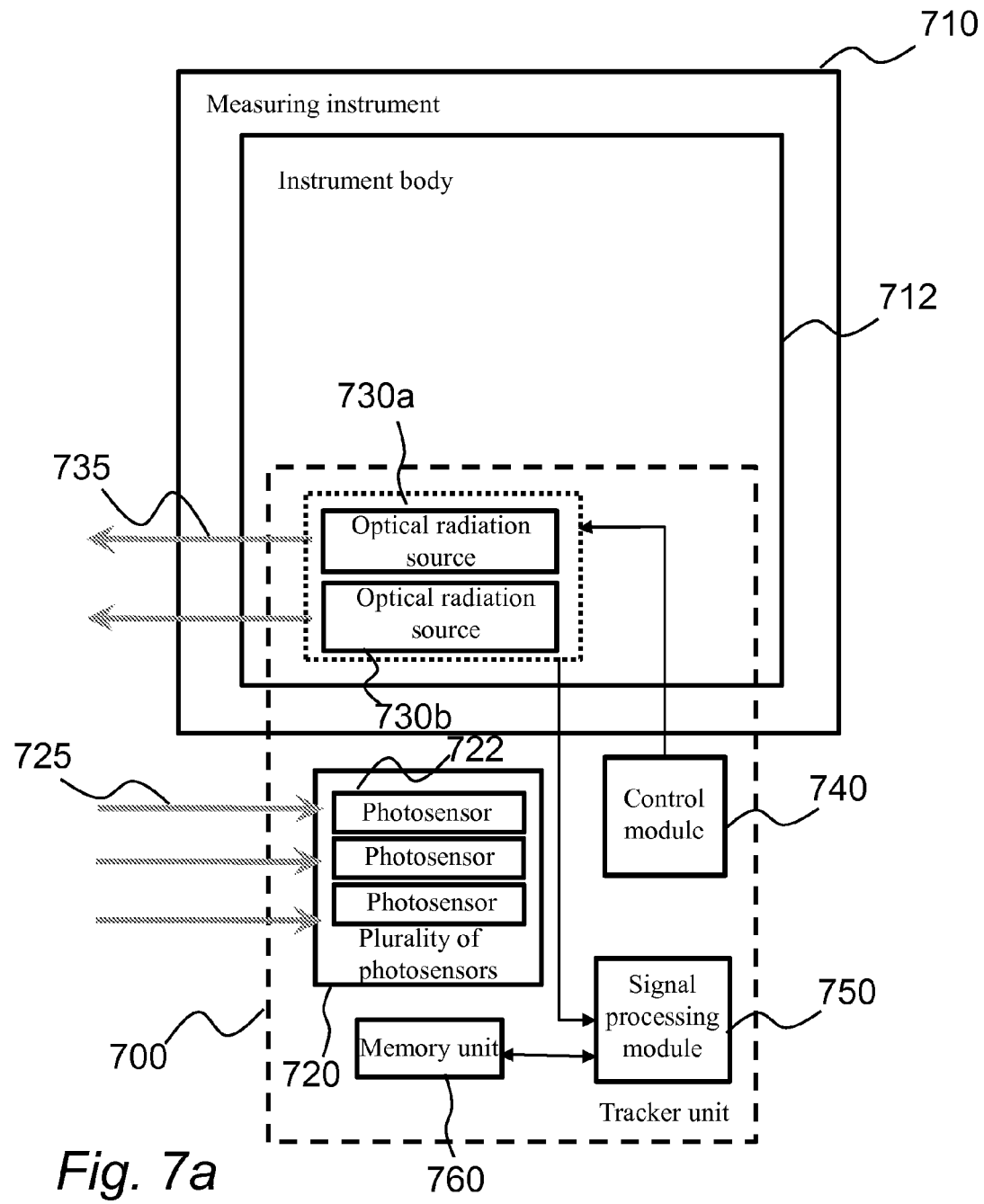
FIG. 7a is a schematic block diagram of a tracker unit according to an exemplifying embodiment of the present invention.

Referring now to FIG. 7a, there is shown a schematic block diagram of a tracker unit 700 according to an exemplifying embodiment of the present invention. The tracker unit 700 is intended for use in a measuring instrument 710 including an instrument body 712. Specifically, the tracker unit 700 is adapted to distinguish at least one specific target (not shown in FIG. 7a) comprising at least one retroreflector from other targets and/or other reflective objects (not shown in FIG. 7a) in the vicinity of the measuring instrument 710. The tracker unit 700 comprises a plurality 720 of photosensors 722 (of which only one is referenced by the reference numeral 720). Each photosensor 722 is adapted to generate a signal corresponding to intensity of reflected optical radiation 725 impinging on the photosensor 722. Although the plurality 720 of photosensors 722 is indicated in FIG. 7a as being configured as an array of photosensors 722, such a configuration is merely exemplifying; the plurality 720 of photosensors 722 can rather be configured according to user, design and/or application requirements/needs.

The tracker unit 700 comprises a first 730a and a second 730b optical radiation source arranged in the instrument body 712. Each of the first and second optical radiation sources 730a, 730b is configured to emit optical radiation 735 when activated. The first optical radiation source 730a is coaxially arranged in relation to at least some photosensors 722 in the plurality 720 of photosensors 722 and the second optical radiation source 730b is eccentrically arranged in relation to first optical radiation source 730a.

The tracker unit 700 comprises a control module 740 and a signal processing module 750.

The control module 740 is adapted to at least once selectively activate and deactivate the first and/or the second optical radiation source 730a, 730b. The control module 740 is adapted to cause the plurality 720 of photosensors 722 to generate at least one first set of signals during a period when the first optical radiation source 730a is activated and the second optical radiation source 730b is deactivated, and generate at least one second set of signals during a period when the second optical radiation source 730b is activated and the first optical radiation source 730a is deactivated.

The signal processing module 750 is adapted to, on basis of a comparison between the information extracted on basis of the first set of signals and the second set of signals, respectively, distinguish at least one specific target from other targets and/or other reflective objects in the vicinity of the measuring instrument 710.

The tracker unit 700 comprises a memory unit 760 adapted to store information extracted on basis of at least one set of signals. The memory unit 760 is optional.

Figure 7B:
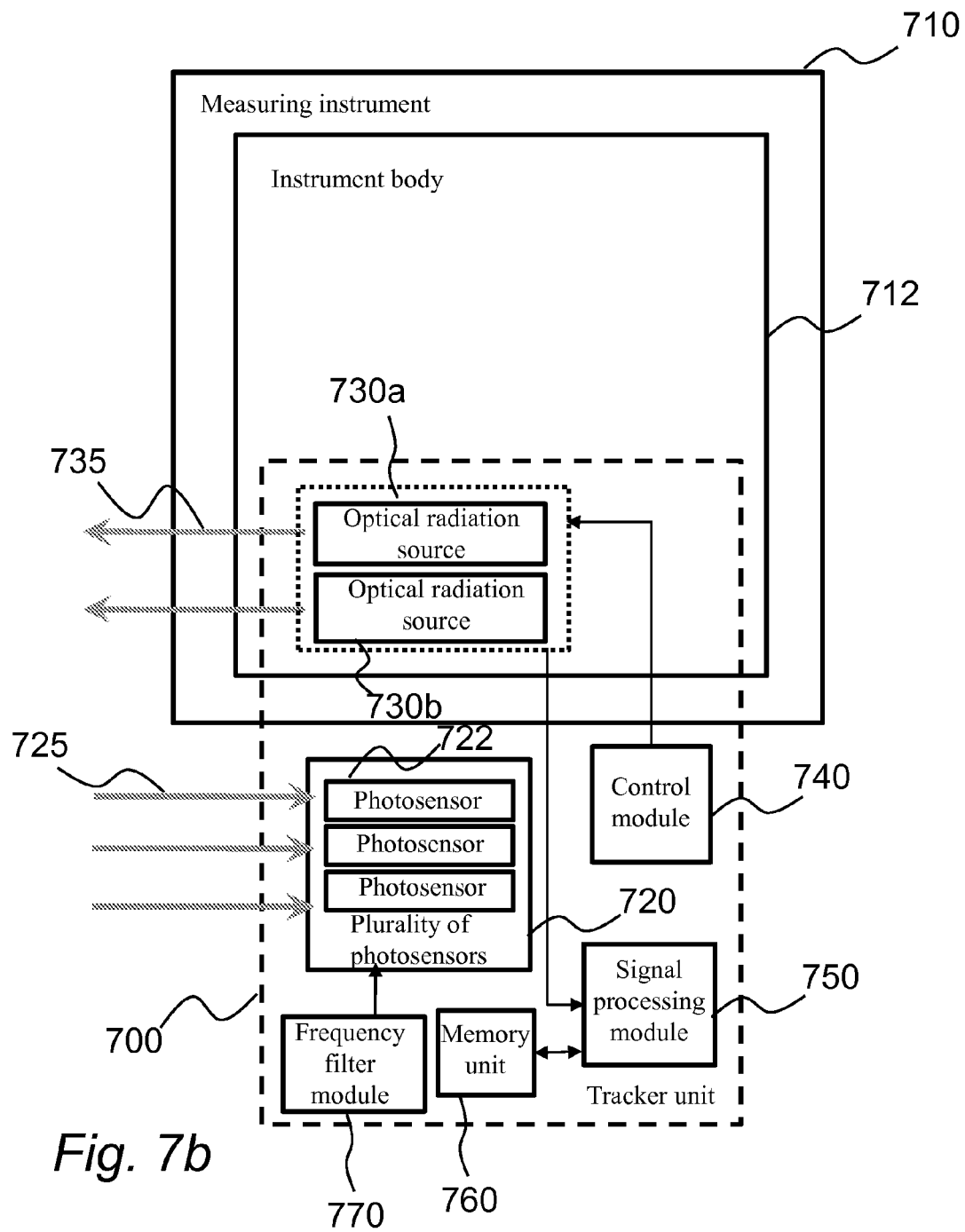
FIG. 7b is a schematic block diagram of a tracker unit according to another exemplifying embodiment of the present invention.

Referring now to FIG. 7b, there is shown a schematic block diagram of a tracker unit 700 according to another exemplifying embodiment of the present invention. The tracker unit 700 comprises a plurality 720 of photosensors 722, a first 730a and a second 730b optical radiation source, a control module 740 and a signal processing module 750. The function and use of these components are similar to or same as the function and use of the components comprised in the tracker unit 700 described with reference to FIG. 7a. Detailed description of these components with respect to FIG. 7b is therefore omitted.

With further reference to FIG. 7b, the tracker unit 700 comprises a frequency filter module 770 adapted to adapted to block reflected optical radiation impinging on the plurality 720 of photosensors 722 that have frequencies outside a predetermined frequency interval including a predetermined frequency. Each of the first and second optical radiation sources 730a, 730b is configured to emit optical radiation having the predetermined frequency.

Referring now to FIG. 8, there is shown a flowchart of a method 800 for operating a tracker unit according to an exemplifying embodiment of the present invention. The tracker unit is intended for use in a measuring instrument including an instrument body, for distinguishing at least one specific target comprising at least one retroreflector from other targets and/or other reflective objects in the vicinity of the measuring instrument. The tracker unit comprises a plurality of photosensors, where each photosensor is adapted to generate a signal corresponding to intensity of reflected optical radiation impinging on the photosensor. The tracker unit comprises a first and a second optical radiation source arranged in the instrument body. Each of the first and second optical radiation sources is configured to emit optical radiation when activated. The first optical radiation source is coaxially arranged in relation to at least some of the photosensors in the plurality of photosensors and the second optical radiation source is eccentrically arranged in relation to the first optical radiation source.

First, in step S800, a process of distinguishing at least one specific target comprising at least one retroreflector from other targets and/or other reflective objects in the vicinity of the measuring instrument is initiated. This can for example be performed by an operator operating the measuring instrument/tracker unit via a control panel or the like or via machine instructions transferred in a wired or wireless manner to a receiver in the measuring instrument.

At step S810, the first optical radiation source is selectively activated while the second optical radiation source is deactivated. This is performed at least once. Thereby, the plurality of photosensors is caused to generate at least one first set of signals.

At step S820, the second optical radiation source is selectively activated while the first optical radiation source is deactivated. This is performed at least once. Thereby, the plurality of photosensors is caused to generate at least one second set of signals.

At step S830, the at least one first set of signals and the at least one second set of signals, respectively, are processed such as to extract information on basis of the at least one first set of signals and the at least one second set of signals, respectively, regarding presence of reflective objects in the vicinity of the measuring instrument.

At step S840, at least one specific target is distinguished from other targets and/or other reflective objects in the vicinity of the measuring instrument on basis of a comparison between the information extracted on basis of the at least one first set of signals and the at least one second set of signals, respectively.

Optionally (indicated by dashed lines in FIG. 8), at a step S850 the at least one first set of signals and the at least one second set of signals, respectively, are processed such as to extract information on basis of the at least one first set of signals and the at least one second set of signals, respectively, and the position of each of the respective photosensors relatively to the other photosensors, regarding identity and localization of reflective objects in the vicinity of the measuring instrument.

Then, optionally, at a step S860 reflective objects having a corresponding localization as determined on basis of both the information extracted on basis of the at least one first set of signals and the information extracted on basis of the at least one second set of signals are determined to be false targets.

Then, optionally, at a step S870 reflective objects having a localization as determined on basis of the information extracted on basis of the at least one first set of signals that do not correspond to the localization of any one reflective object as determined on basis of the information extracted on basis of the at least one second set of signals are determined to be targets.

Referring now to FIG. 9, there are shown schematic views of computer readable digital storage mediums 900 according to exemplifying embodiments of the present invention, comprising a DVD 900a and a floppy disk 900b. On each of the DVD 900a and the floppy disk 900b there may be stored a computer program comprising computer code adapted to perform, when executed in a processor unit, a method according to embodiments of the present invention such as have been described herein.

Although only two different types of computer-readable digital storage mediums have been described above with reference to FIG. 9, the present invention encompasses embodiments employing any other suitable type of computer-readable digital storage medium, such as, but not limited to, a non-volatile memory, a hard disk drive, a CD, a Flash memory, magnetic tape, a USB memory device, a Zip drive, etc.

Furthermore, the tracker unit typically comprises one or more micro-processors (not shown in the drawings) or some other device with computing capabilities, e.g. an application specific integrated circuit (ASIC), a field programmable gate array (FPGA), a complex programmable logic device (CPLD), etc., in order to perform operations for operating the tracker unit. When performing steps of different embodiments of the method of the present invention, the microprocessor typically executes appropriate software that is downloaded to the tracker unit and stored in a suitable storage area, such as for example a Random Access Memory (RAM), a Flash memory or a hard disk drive. Such a microprocessor or processing unit may alternatively or optionally be located externally relatively to the tracker unit (and electrically connected to the tracker unit).

Although exemplary embodiments of the present invention have been described herein, it should be apparent to those having ordinary skill in the art that a number of changes, modifications or alterations to the invention as described herein may be made. Thus, the above description of the various embodiments of the present invention and the accompanying drawings are to be regarded as non-limiting examples of the invention and the scope of protection is defined by the appended claims. Any reference signs in the claims should not be construed as limiting the scope.

The invention claimed is:

1. A tracker unit for a measuring instrument including an instrument body, the tracker unit configured to distinguish at least one specific target comprising at least one retroreflector from other targets and other reflective objects in a vicinity of the measuring instrument, the tracker unit comprising:
 a plurality of photosensors, each of the plurality of photosensors configured to generate a signal corresponding to intensity of reflected optical radiation impinging on a corresponding one of the plurality of photosensors;
 a first optical radiation source and at least one second optical radiation source, each of the first optical radiation source and the at least one second optical radiation source being arranged in the instrument body and configured to emit optical radiation when activated, the first optical radiation source being coaxially arranged in relation to at least some of the plurality of photosensors and the at least one second optical radiation source being eccentrically arranged in relation to the first optical radiation source;
 a control module configured to,
  at least once, selectively activate and deactivate the first optical radiation source and the at least one second optical radiation source, and
  cause the plurality of photosensors to,
   generate at least one first set of signals during a first period when the first optical radiation source is activated and the at least one second optical radiation source is deactivated, and
   generate at least one second set of signals during a second period when the at least one second optical radiation source is activated and the first optical radiation source is deactivated; and
 a signal processing module configured to,
  extract first information regarding a presence of at least one reflective object in a vicinity of the measuring instrument based on the at least one first set of signals,
  extract second information regarding the presence of the at least one reflective object in the vicinity of the measuring instrument based on the at least one second set of signals, and
  compare the first extracted information and the second extracted information to distinguish the at least one specific target from the other targets and the other reflective objects in the vicinity of the measuring instrument.

2. The tracker unit according to claim 1, wherein the signal processing module is further configured to,
 extract additional information regarding an identity and a localization of the at least one reflective object based on the at least one first set of signals, the at least one second set of signals and a position of each of the plurality of photosensors relatively to other ones of the plurality of photosensors,
 determine that the at least one reflective object is not the at least one specific target if the localization of the at least one reflective object as determined based on the at least one first set of signals corresponds to the localization of the at least one reflective object as determined based on the at least one second set of signals; and
 determine that the at least one reflective object is the at least one specific target if the localization of the at least one reflective object as determined based on the at least one first set of signals does not correspond to the localization of any of the at least one reflective object as determined based on the information extracted on the basis of the at least one second set of signals.

3. The tracker unit according to claim 2, wherein
the control module is further configured to cause the plurality of photosensors to generate at least one third set of signals and at least one fourth set of signals during respective periods when all of the first and the second optical radiation sources are deactivated, the at least one first set of signals and the at least one third set of signals being generated consecutively and the at least one second set of signals and the at least one fourth set of signals being generated consecutively; and the signal processing module is further configured to, extract third information regarding the identity and the localization of the at least one reflective object based on the at least one first set of signals, the at least one third set of signals and the position of each of the plurality of photosensors relatively to other ones of the plurality of photosensors, extract fourth information regarding the identity and the localization of the at least one reflective object based on the at least one second set of signals, the at least one fourth set of signals, and the position of each of the plurality of photosensors relatively to other ones of the plurality of photosensors, determine that the at least one reflective object is not the at least one specific target if the localization of the at least one reflective object as determined based on the at least one first set of signals and the at least one third set of signals corresponds to the localization of the at least one reflective object as determined based on the at least one second set of signals and the at least one fourth set of signals, and determine that the at least one reflective object is the at least one specific target if the localization of the at least one reflective object as determined based on the at least one first set of signals and the at least one third set of signals does not correspond to the localization of any of the at least one reflective object as determined based the at least one second set of signals and the at least one fourth set of signals.

4. The tracker unit according to claim 2, wherein
each of the first optical radiation source and the at least one second optical radiation source is configured to emit optical radiation having a frequency and the first optical radiation source and the at least one second optical radiation source are configured such that phases of the optical radiation emitted by the first optical radiation source and the at least one second optical radiation source, respectively, differ by a phase shift, and the tracker unit further comprises a frequency filter module configured to block reflected optical radiation impinging on the plurality of photosensors that have frequencies outside a frequency interval including the frequency.

5. The tracker unit according to claim 2, wherein the signal processing module is further configured to determine that the at least one reflective object, for which the localization determined based on the at least one first set of signals does not correspond to the localization of any of the at least one reflective object as determined based on the information extracted on the basis of the at least one second set of signals, is not the at least one specific target if a difference between intensities corresponding to the at least one first set of signals and intensities corresponding to the at least one second set of signals is below a an intensity threshold.

6. The tracker unit according to claim 5, wherein
the control module is further configured to cause the plurality of photosensors to generate at least one third set of signals and at least one fourth set of signals during respective periods when all of the first and the second optical radiation sources are deactivated, the at least one first set of signals and the at least one third set of signals being generated consecutively and the at least one second set of signals and the at least one fourth set of signals being generated consecutively; and the signal processing module is further configured to, extract third information regarding the identity and the localization of the at least one reflective object based on the at least one first set of signals, the at least one third set of signals and the position of each of the plurality of photosensors relatively to other ones of the plurality of photosensors, extract fourth information regarding the identity and the localization of the at least one reflective object based on the at least one second set of signals, the at least one fourth set of signals, and the position of each of the plurality of photosensors relatively to other ones of the plurality of photosensors, determine that the at least one reflective object is not the at least one specific target if the localization of the at least one reflective object as determined based on the at least one first set of signals and the at least one third set of signals corresponds to the localization of the at least one reflective object as determined based on the at least one second set of signals and the at least one fourth set of signals, and determine that the at least one reflective object is the at least one specific target if the localization of the at least one reflective object as determined based on the at least one first set of signals and the at least one third set of signals does not correspond to the localization of any of the at least one reflective object as determined based the at least one second set of signals and the at least one fourth set of signals.

7. The tracker unit according to claim 5, wherein
each of the first optical radiation source and the at least one second optical radiation source is configured to emit optical radiation having a frequency, the first optical radiation source and the at least one second optical radiation source are configured such that phases of the optical radiation emitted by source respectively, differ by a phase shift, and the tracker unit further comprises a frequency filter module configured to block reflected optical radiation impinging on the plurality of photosensors that have frequencies outside a frequency interval including the frequency.

8. The tracker unit according to claim 1, wherein
the control module is further configured to cause the plurality of photosensors to generate at least one third set of signals and at least one fourth set of signals during respective periods when all of the first optical radiation source and the at least one second optical radiation source are deactivated, the at least one first set of signals and the at least one third set of signals being generated consecutively and the at least one second set of signals and the at least one fourth set of signals being generated consecutively; and the signal processing module is further configured to, extract third information regarding an identity and a localization of the at least one reflective object based on the at least one first set of signals, the at least one third set of signals and the position of each of the plurality of photosensors relatively to other ones of the plurality of photosensors, extract fourth information regarding the identity and the localization of the at least one reflective object based on the at least one second set of signals, the at least one fourth set of signals, and the position of each of the plurality of photosensors relatively to other ones of the plurality of photosensors, determine that the at least one reflective object is not the at least one specific target if the localization of the at least one reflective object as determined based on the at least one first set of signals and the at least one third set of signals corresponds to the localization of the at least one reflective object as determined based on the at least one second set of signals and the at least one fourth set of signals, and determine that the at least one reflective object is the at least one specific target if the localization of the at least one reflective object as determined based on the at least one first set of signals and the at least one third set of signals does not correspond to the localization of any of the at least one reflective object as determined based the at least one second set of signals and the at least one fourth set of signals.

9. The tracker unit according to claim 1, wherein the first optical radiation source and the at least one second optical radiation source are arranged such that a distance between the first optical radiation source and the at least one second optical radiation source amounts to at least an extent in a dimension of the at least one retroreflector of at least one target.

10. The tracker unit according to claim 1, wherein each of the first optical radiation source and the at least one second optical radiation source is configured to emit optical radiation having a frequency, at least one of the first optical radiation source and the at least one second optical radiation source is configured such that phases of the optical radiation emitted by the first optical radiation source and the at least one second optical radiation, source differ by a phase shift, and the tracker unit further comprises a frequency filter module configured to block reflected optical radiation impinging on the plurality of photosensors that have frequencies outside a frequency interval including the frequency.

11. The tracker unit according to claim 1, wherein the plurality of photosensors are incorporated in a camera device comprising an imaging device configured to, on instruction from the control module, capture at least one image and the at least one first set of signals and the at least one second sets of signals constitute a first image and a second image captured by the imaging device, respectively, the imaging device is configured to produce a first image representation and a second image representation of the first image and the second image, respectively, and the signal processing module is comprised in an image processing module configured to, process the first image representation and the second image representation so as to create at least one differential image between the first image representation and the second image representation, extract information regarding presence of reflective objects in the at least one differential image, and on basis of the extracted information, distinguish the at least one reflective target from the other reflective targets and the other reflective objects being present in images captured when the first optical radiation source is activated and the at least one second optical radiation source is deactivated.

12. The tracker unit according to claim 11, wherein the extracted information regarding objects being present in said at least one differential image comprises one or more of:

a shapefactor;
an area; and
a signal strength.

13. The tracker unit according to claim 1, comprising a plurality of second optical radiation sources, wherein the control module is configured to at least one of selectively activate and deactivate each of the plurality of second optical radiation sources concurrently.

14. The tracker unit according to claim 13, wherein the plurality of optical radiation sources are circularly arranged in a spaced succession relatively to the first optical radiation source.

15. A method for operating a tracker unit for a measuring instrument including an instrument body for distinguishing at least one specific target comprising at least one retroreflector from other targets and other reflective objects in the vicinity of the measuring instrument, the method comprising:

at least once selectively activating a first optical radiation source while at least one second optical radiation source is deactivated, thereby causing a plurality of photosensors of the tracker unit to generate at least one first set of signals, each of the first optical radiation source and the at least one second optical radiation source emitting optical radiation when activated, each of the plurality of photosensors generating a signal corresponding to intensity of reflected optical radiation impinging on a corresponding one of the plurality of photosensors;

at least once selectively activating the at least one second optical radiation source while the first optical radiation source is deactivated, thereby causing the plurality of photosensors to generate at least one second set of signals;

processing the at least one first set of signals to extract first information and the at least one second set of signals to extract second information, respectively, the first information and the second information corresponding to presence of reflective objects in a vicinity of the measuring instrument; and compare the first extracted information and the second extracted information for distinguishing the at least one specific target from the other targets and the other reflective objects in the vicinity of the measuring instrument.

16. The method according to claim 15, further comprising:

processing the at least one first set of signals and the at least one second set of signals, respectively, to extract additional information regarding an identity and a localization of the at least one reflective object based on the at least one first set of signals, the at least one second set of signals and a position of each of the plurality of photosensors relatively to other ones of the plurality of photosensors;

determining that the at least one reflective object is not the at least one specific target if the localization of the at least one reflective object as determined based on the at least one first set of signals corresponds to the localization of the at least one reflective object as determined based on the at least one second set of signals; and determining that the at least one reflective object is the at least one specific target if the localization of the at least one reflective object as determined based on the at least one first set of signals does not correspond to the localization of any of the at least one reflective object as determined based on the information extracted on the basis of the at least one second set of signals.

17. The method according to claim 15, further comprising:

at least twice selectively deactivating the first optical radiation source and the at least one second optical radiation source during respective periods, thereby causing the plurality of photosensors to generate at least one third set of signals and at least one fourth set of signals, said respective periods are selected such that the at least one first set of signals and the at least one third set of signals being generated consecutively and the at least one second set of signals and the at least one fourth set of signals being generated consecutively;

extracting third information regarding an identity and a localization of reflective objects in the vicinity of the measuring instrument based on the at least one first set of signals and the at least one third set of signals;

extracting fourth information regarding the identity and the localization of reflective objects in the vicinity of the measuring instrument based on the at least one second set of signals, the at least one fourth set of signals and the position of each of the plurality of photosensors relatively to other ones of the plurality of photosensors;

determining that the at least one reflective object is not the at least one specific target if the localization of the at least one reflective object as determined based on the at least one first set of signals and the at least one third set of signals corresponds to the localization of the at least one reflective objection as determined based on the at least one second set of signals and the at least one fourth set of signals; and determining that the at least one reflective object is the at least one specific target if the localization of the at least one reflective object as determined based on the at least one first set of signals and the at least one third set of signals does not correspond to the localization of any one reflective object as determined based on the at least one second set of signals and the at least one fourth set of signals.

18. The method according to claim 16, further comprising:
at least twice selectively deactivating the first optical radiation source and the at least one second optical radiation source during respective periods, thereby causing the plurality of photosensors to generate at least one third set of signals and at least one fourth set of signals, said respective periods are selected such that the at least one first set of signals and the at least one third set of signals being generated consecutively and the at least one second set of signals and the at least one fourth set of signals being generated consecutively;

extracting third information regarding an identity and a localization of reflective objects in the vicinity of the measuring instrument based on the at least one first set of signals and the at least one third set of signals;

extracting fourth information regarding the identity and the localization of reflective objects in the vicinity of the measuring instrument based on the at least one second set of signals, the at least one fourth set of signals and the position of each of the plurality of photosensors relatively to other ones of the plurality of photosensors;

determining that the at least one reflective object is not the at least one specific target if the localization of the at least one reflective object as determined based on the at least one first set of signals and the at least one third set of signals corresponds to the localization of the at least one reflective objection as determined based on the at least one second set of signals and the at least one fourth set of signals; and determining that the at least one reflective object is the at least one specific target if the localization of the at least one reflective object as determined based on the at least one first set of signals and the at least one third set of signals does not correspond to the localization of any one reflective object as determined based on the at least one second set of signals and the at least one fourth set of signals.

19. A non-transitory computer readable medium including a computer program product, the computer program product comprising computer instructions, which when executed in a processing unit, cause the processing unit to perform a method according to claim 15.

\* \* \* \* \*